(12) United States Patent
Mateo

(10) Patent No.: US 8,651,143 B2
(45) Date of Patent: Feb. 18, 2014

(54) DEVICE FOR SHUTTING A JETTISONING CIRCUIT OF AN AIRCRAFT

(75) Inventor: Stephane Mateo, Dieupentale (FR)

(73) Assignee: Airbus Operations, Toulouse (FR)

( * ) Notice: Subject to any disclaimer, the term of this patent is extended or adjusted under 35 U.S.C. 154(b) by 53 days.

(21) Appl. No.: 13/382,078

(22) PCT Filed: Jul. 7, 2010

(86) PCT No.: PCT/FR2010/051429
§ 371 (c)(1),
(2), (4) Date: Jan. 3, 2012

(87) PCT Pub. No.: WO2011/004119
PCT Pub. Date: Jan. 13, 2011

(65) Prior Publication Data
US 2012/0104173 A1 May 3, 2012

(30) Foreign Application Priority Data

Jul. 10, 2009 (FR) ...................................... 09 54824

(51) Int. Cl.
*F16L 55/10* (2006.01)
(52) U.S. Cl.
USPC .................... 138/89; 138/90; 138/45; 138/46
(58) Field of Classification Search
USPC .................... 138/89, 90, 93, 45, 46
See application file for complete search history.

(56) References Cited

U.S. PATENT DOCUMENTS

| | | | | |
|---|---|---|---|---|
| 2,062,519 A * | 12/1936 | Ljungberg | ...................... | 138/90 |
| 2,475,748 A * | 7/1949 | Leroy | .............. | 138/90 |
| 2,764,184 A * | 9/1956 | Fitzhugh et al. | ................ | 138/89 |
| 2,855,003 A * | 10/1958 | Thaxton | .......................... | 138/90 |
| 2,856,963 A * | 10/1958 | Hoerter | .......................... | 138/89 |
| 2,937,666 A * | 5/1960 | Maisch | .......................... | 138/89 |
| 3,156,373 A * | 11/1964 | Willis | ............................ | 220/237 |
| 3,483,894 A | 12/1969 | Finocchiaro | | |
| 3,618,811 A * | 11/1971 | Martino | ........................ | 220/235 |
| 3,691,609 A * | 9/1972 | Ice et al. | .......................... | 29/252 |
| 3,983,904 A * | 10/1976 | Laviano | .......................... | 138/89 |
| 4,114,654 A * | 9/1978 | Richardson | ..................... | 138/89 |
| 4,303,101 A * | 12/1981 | Tholen | ............................ | 138/89 |
| 4,624,426 A | 11/1986 | Muscatell | | |
| 4,653,540 A * | 3/1987 | Epstein | ............................ | 138/89 |

FOREIGN PATENT DOCUMENTS

WO WO 2008/017152 A1 2/2008

OTHER PUBLICATIONS

Written Opinion of the International Searching Authority issued in International Patent Application No. PCT/FR2010/051429 dated Nov. 5, 2010 (with translation).
Search Report issued in French Patent Application No. 0954824 dated Feb. 17, 2010 (with translation).
International Search Report issued in International Application No. PCT/FR2010/051429 dated Nov. 5, 2010 (with translation).

* cited by examiner

*Primary Examiner* — Patrick F Brinson
(74) *Attorney, Agent, or Firm* — Oliff PLC

(57) ABSTRACT

A device for shutting an aircraft jettisoning circuit includes a coupling endpiece. The endpiece carries a sealing gasket and means suitable for modifying a dimension of the gasket.

14 Claims, 3 Drawing Sheets

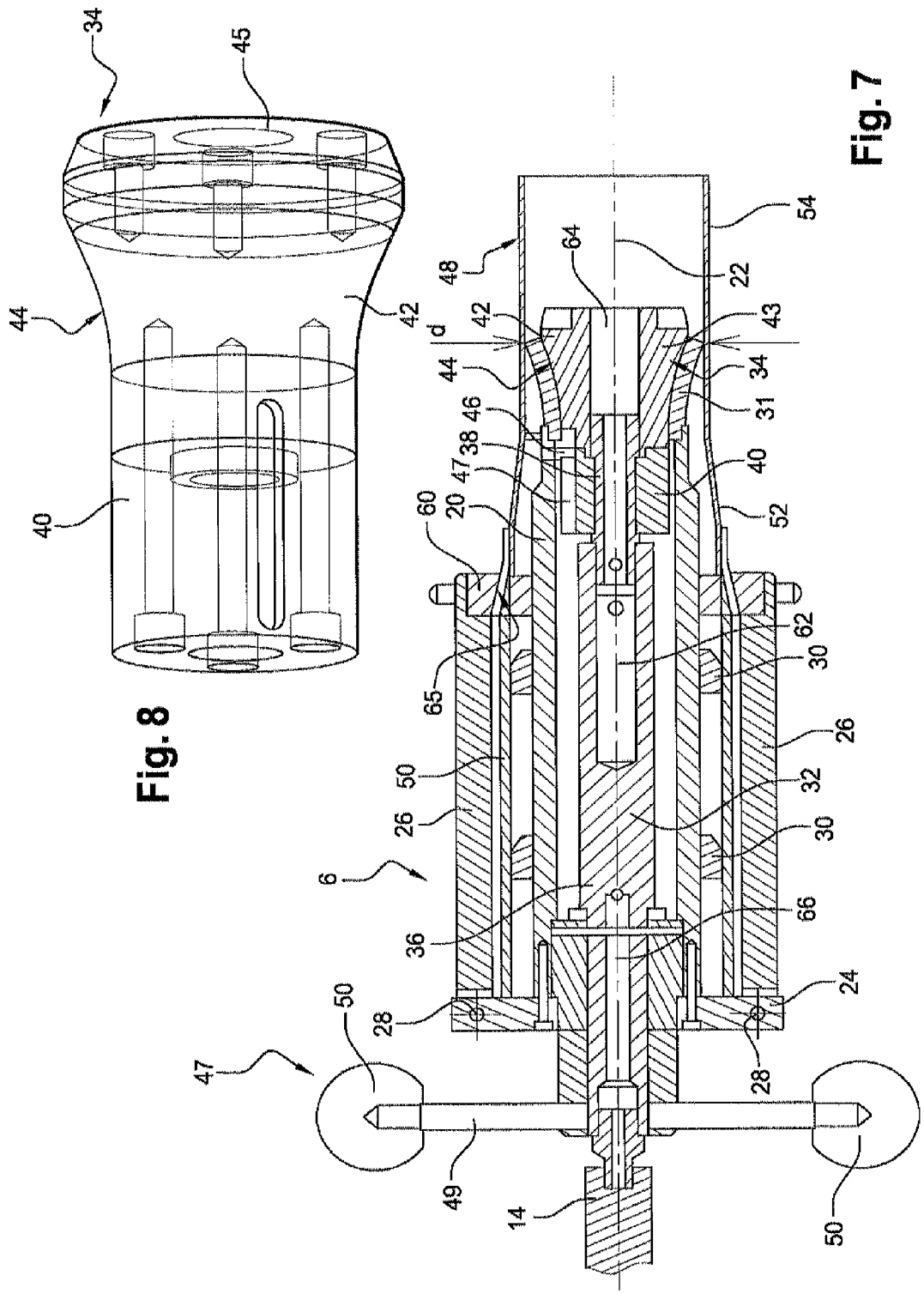

DEVICE FOR SHUTTING A JETTISONING CIRCUIT OF AN AIRCRAFT

FIELD OF THE INVENTION

The invention relates to devices for shutting aircraft jettisoning circuits.

BACKGROUND OF THE INVENTION

Certain airplanes are provided with a system that serves, when circumstances make this necessary, to dump quickly the fuel contained in the tanks. Such a system is referred to as a jettisoning system. The terms "fuel dumping" and "fuel jettisoning" are in widespread use.

In order to ensure that the jettisoning circuit is operating properly, it is necessary to subject it to leak testing. Testing then consists in putting both the circuit and the tank under pressure by means of an air-helium mixture, e.g. at a nominal pressure of 350 hectopascals (hPa).

It is therefore desirable to have a device that enables the jettisoning circuit to be shut by being fitted to the outlet from the circuit, that enables the pressure that exists inside the circuit to be viewed, and that also enables the circuit to be vented after leak testing has been terminated.

Such a device should be capable of being used on airplane assembly lines and also in workshops that handle airplanes having tanks and fuel circuits that have already received kerosene. That is why such tooling needs to comply with regulatory requirements, in particular with standards relating to non-electric tooling suitable for use in an explosive zone. Thus, the device must make it possible to shut the jettisoning circuit while ensuring that it is properly sealed so as to avoid any risk of fuel being accidentally discharged.

In addition, the device must not damage the metal portions of the airplane. In this respect, a problem that arises when making such a device stems from the outlet configuration of the jettisoning circuit on certain airplanes. This outlet forms a sleeve having an outlet in which it is necessary to insert the device in order to establish sealing between the inside of the sleeve and the device. Nevertheless, the sleeve presents fastening rivets that project into the inside of the sleeve so as to define a passage of a size that is smaller than the size of the zone located beyond the rivets and with which the device is to establish sealing. It is therefore necessary to have a device that can go past the rivets without damaging them, and then establish satisfactory sealing in the following zone.

OBJECT AND SUMMARY OF THE INVENTION

An object of the invention is to provide a jettisoning circuit test device that makes it possible to establish sealing in such an outlet configuration of the circuit.

To this end, the invention provides an aircraft jettisoning circuit shutter device, the device comprising a coupling endpiece, the endpiece carrying a sealing gasket and means for modifying a dimension of the gasket.

Thus, the endpiece may be given, at will, a retraced configuration or an extended configuration in which the dimension of the gasket is greater than in the retracted configuration. It is thus possible to pass the endpiece, while it is in the retracted configuration, through the narrow outlet zone of the circuit, and then to give it an expanded configuration so as to establish sealing with the outlet of the circuit beyond said zone.

Advantageously, the modification means are suitable for modifying a dimension of a segment of the gasket, such as an edge, without modifying a dimension of some other segment of the gasket, such as an edge.

This simplifies making the device insofar as it is generally easier to deform a single segment of the gasket than it is to deform the entire gasket. Furthermore, this arrangement makes it possible to flatten the gasket over only a segment of its length, so that it is not flattened over its entire length as a general rule. In particular, in the shutting position, the gasket generally presents an outside diameter that is not constant along the length of the gasket and it presents a shape that is not cylindrical. Consequently, the device is easier to fit into ducts of diameters that are very different from one another. Furthermore, this adaptability makes it possible to begin by giving the endpiece a total diameter that is much less than that of the duct in which it is to penetrate, in particular so as to avoid damaging certain zones of the duct, e.g. rivets or other elements projecting into the duct in a radial direction.

Preferably, the modification means occupy a main duct of the gasket.

Thus, these means are particularly compact and do not significantly increase the dimensions of the device.

Advantageously, the modification means are mounted to move relative to the gasket.

Advantageously, the modification means present a face forming a ramp for the gasket.

Thus, the diameter of the gasket is modified by sliding over the ramp-forming face.

Preferably, the face presents a curved profile with a center of curvature situated outside the gasket.

Thus, the greater the increase in the diameter of the gasket, the faster it deforms.

Preferably, the modification means are adjustable.

Advantageously, the device includes a member, such as a capstan, for controlling the modification means.

Preferably, the device is suitable for putting the duct and the endpiece into gas-flow communication through the gasket.

The device includes in particular a flexible pneumatic hose and a rotary coupling, the hose and the coupling being suitable for establishing said communication.

Advantageously, the device has a cylinder and means independent of the endpiece for fastening the cylinder to the circuit.

Thus, the function of fastening the shutter device to the jettisoning circuit is not performed, at least for the most part, by the endpiece, but rather by the fastener means. It is thus possible to dedicate the endpiece to the function of providing sealing.

The invention also provides a method of shutting an aircraft jettisoning circuit by means of a device that comprises a coupling endpiece carrying a sealing gasket and means for modifying a dimension of the gasket.

BRIEF DESCRIPTION OF THE DRAWINGS

Other characteristics and advantages of the invention appear further from the following description of an embodiment given by way of non-limiting example and with reference to the accompanying drawings, in which:

FIG. 7 is an axial section view of the FIG. 6 device mounted on the outlet of FIG. 5; and FIG. 8 is a perspective view of the stopper of the FIG. 7 device.

MORE DETAILED DESCRIPTION

Figure 6:
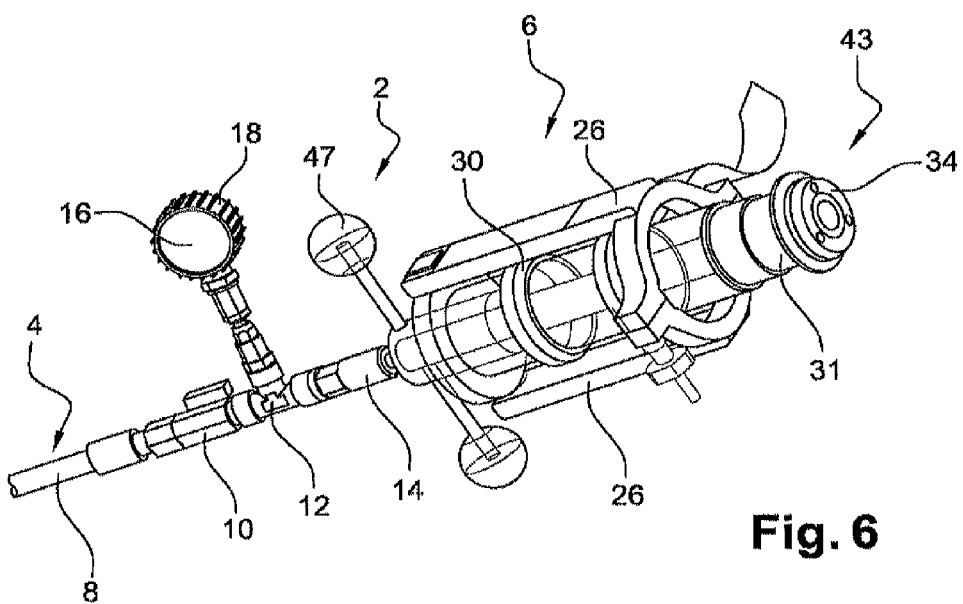
FIG. 6 is a perspective view of the FIG. 1 device while in use.

There can be seen in particular in FIG. 6, tooling 2 comprising a pneumatic line 4 and a shutter device 6 of the invention.

The pneumatic line 4 comprises the following elements connected in series one after another and in gas-flow communication with one another: a flexible pneumatic hose 8; a metal valve 10; a T-coupling 12; and finally a rotary coupling 14. On its third branch, the T-coupling carries a pressure gauge 16 provided with a protective collar 18. The shutter device 6 is fastened to the free end of the rotary coupling.

Figure 3:
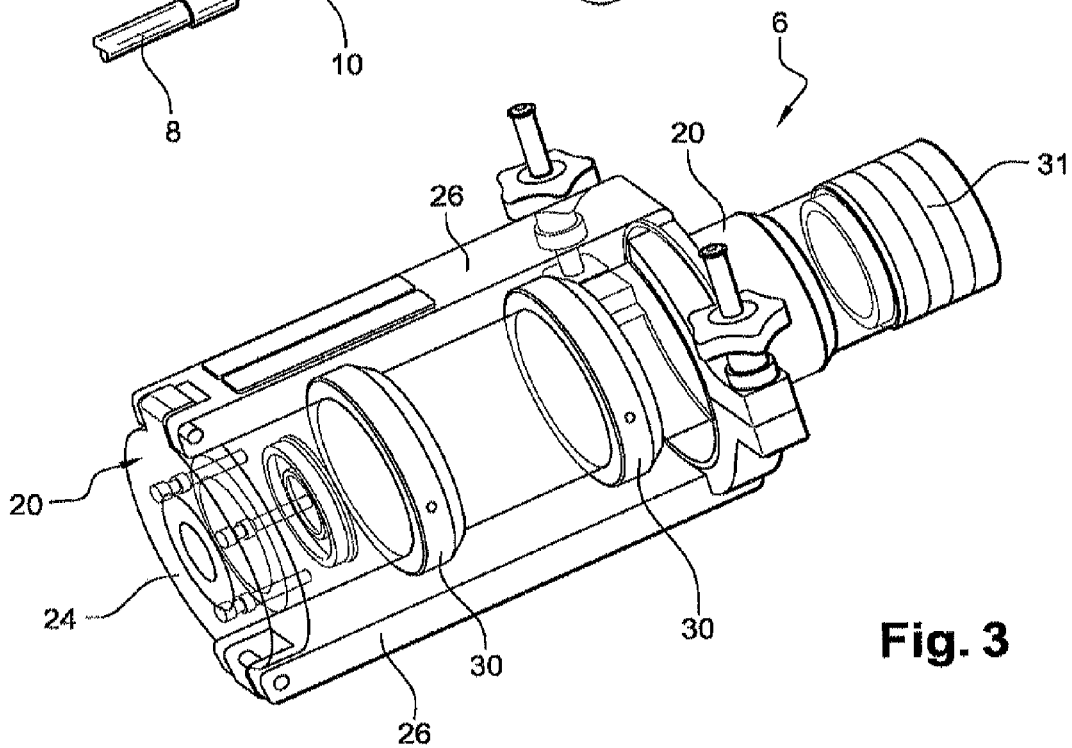
FIG. 3 is a perspective view of the cylinder, the gasket, and the jaws of the FIG. 1 device.
Figure 4:
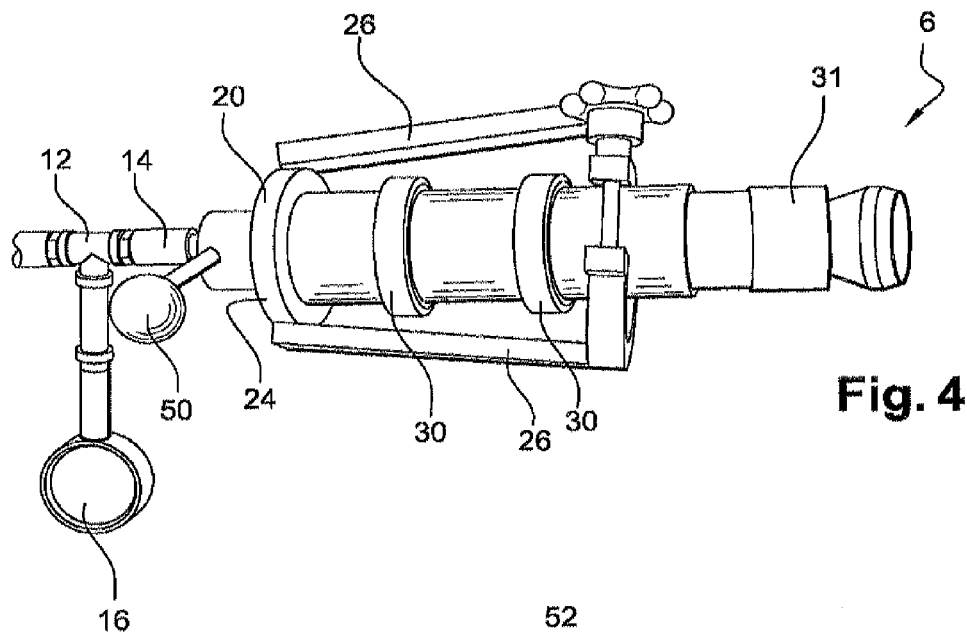
FIG. 4 is a view analogous to FIG. 1 showing the jaws open.

There follows a description of the shutter device given in particular with reference to FIG. 7. The device comprises a cylinder 20 of generally cylindrical shape about an axis 22. At its proximal axial end, it includes a yoke 24 of annular shape, extending generally in a plane perpendicular to the axis 22. The yoke carries two arms 26 located in geometrically opposite positions on either side of the axis 22, these arms being shown in respective top and bottom portions of the figures. Each of the arms 26 is hinged to the yoke 24 about a pin 28 of axis perpendicular to the axis 22 and not intersecting it. The arms 26 may thus have a closed configuration in which they are close to the cylinder 20 and extend parallel to the axis 22, as shown in FIGS. 1, 3, 6, and 7, and an open configuration in which they are inclined relative to the axis 22 and spaced apart from the cylinder 20, as shown in FIG. 4. Guides or spacers 30, there being two of them in this example, are interposed in the radial direction between the cylinder 20 and the arms 26. The two guides 30 are identical to each other and they follow one another along the axis 22.

The device 6 includes a rod 32 of axis 22 connected via its proximal axial end to the rotary coupling 14. This rod is mounted to be movable in rotation relative to the cylinder 20 about the axis 22. It is prevented from moving in translation relative to the cylinder 20. At its distal axial end, the rod 32 presents a threaded male portion having a stopper or actuator 34 fastened thereon by means of a threaded female portion. In the present example, the main portion of the rod is formed by a part 36 and the thread of the rod is carried by an end part 38 fitted to the main portion 36, being rigidly fastened thereto.

The stopper 34 presents circular symmetry about the axis 22. It comprises a base 40 that presents the threaded female portion for connection with the rod. It includes an actuator portion or cam 42 that presents in particular an outside face 44 of diameter that increases going from its proximal end towards its distal end. This face presents a profile that is convex in a plane that is radial relative to the axis 22, this profile having a center of curvature that extends outside the actuator portion 42. In other words, the face 44 extends between the center of curvature and the axis 22. The face 44 thus has the shape of a trumpet bell.

In the present example, the actuator portion 42 is fastened to the base 40 by means of screws, there being three screws in this example, that extend parallel to the axis 22 and that are regularly distributed about said axis. The orifices associated with the screws pass right through the base 40. The stopper includes a protective collar 45 for protecting the free end of the actuator portion, and likewise screwed thereto in analogous manner.

The cylinder 20 includes a sealing gasket 31 of circular symmetry about the axis 22, in the form of a cylinder with a hollow center. The gasket 31 is rigidly fastened via its proximal axial end to the distal end of the cylinder 20, while its distal axial end is left free. By way of example, the gasket 31 is made of ethylene propylene diene monomer (EPDM) having a hardness of 70 on the Shore scale. The actuator portion 42 of the stopper occupies the central space in the gasket 31.

The device includes adjustable control means for moving the actuator portion 42 relative to the gasket. In the present example, these means comprise a capstan 47 having two radial arms 48 carrying respective ball-shaped handles 50. The capstan is rigidly fastened to the proximal axial end of the rod 32. Means are provided for preventing the stopper 34 from turning relative to the cylinder, which means comprise, for example, a key 46 fastened rigidly to the cylinder and extending in a direction that is radial relative to the axis 22, being movable in a groove 47 of the stopper, extending parallel to the axis 22. Because of the helical connection between the rod 32 and the stopper 34, turning the capstan about the axis 22 relative to the cylinder causes the stopper to slide along the axis 22 relative to the gasket 31.

The gasket 31 bears via its inside face against the outside face 44 of the stopper.

Figure 1:
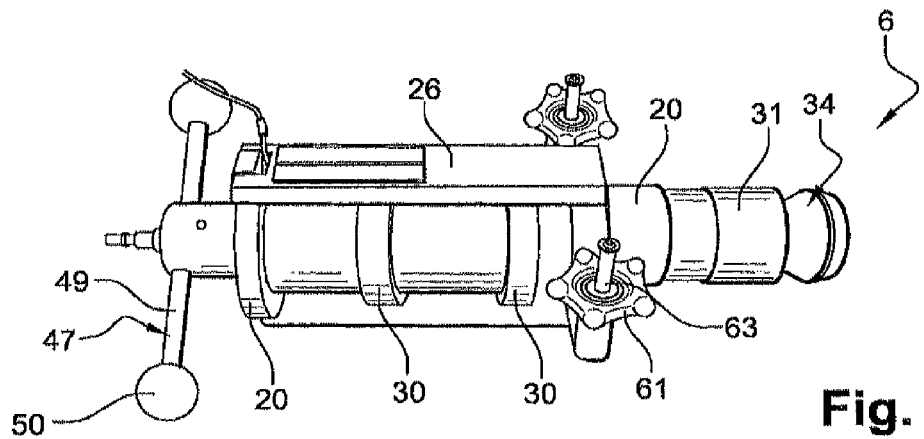
FIG. 1 is a perspective view of the device of the invention in one embodiment.
Figure 2:
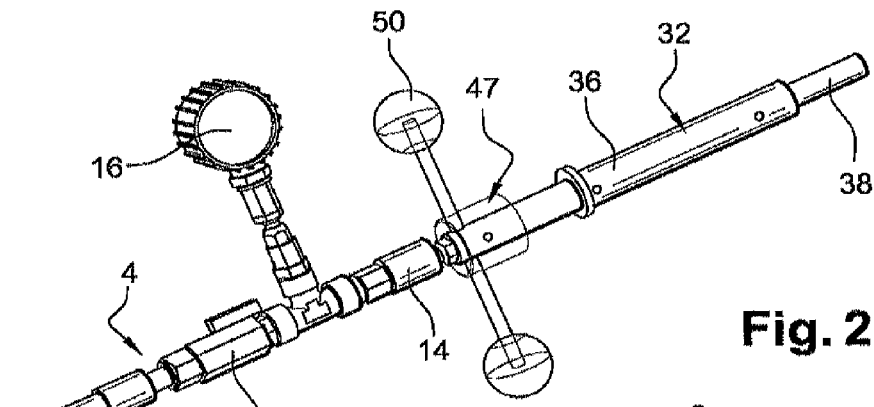
FIG. 2 is a perspective view of the pneumatic circuit associated with the FIG. 1 device.

When the stopper occupies its farthest-forward position relative to the cylinder, i.e. its position farthest to the right in FIG. 7, only the free end portion of the gasket 31 bears against the face 44 on the proximal zone thereof, which zone is cylindrical or practically cylindrical in shape. The gasket 31 is thus in a retracted configuration close to its original cylindrical shape. The outside diameter d of the distal edge of the gasket is small, as shown in FIGS. 1, 3, and 4.

In contrast, when the stopper 34 occupies its position closest to the cylinder, i.e. farthest to the left in FIG. 7, the major fraction of the gasket bears against the face 44. More precisely, in the present example, the distal end zone of the gasket 31 presents an outside diameter d that is greater than in the retracted configuration, as shown in FIGS. 6 and 7. Furthermore, since only the distal portion of the gasket 31 is deformed, the diameter d is greater than the outside diameter of the proximal end zone of the gasket since it bears against the distal end zone of the face 44.

The rod 32 presents a distal cavity 62 in communication with an open cavity 64 of the stopper. The rod also presents a proximal cavity 66 in communication with the rotary coupling 14. The two cavities 62 and 66 of the rod are in mutual communication via radial orifices and via the center of the cylinder.

The gasket 31 and the stopper 34 form a coupling endpiece 43.

Figure 5:
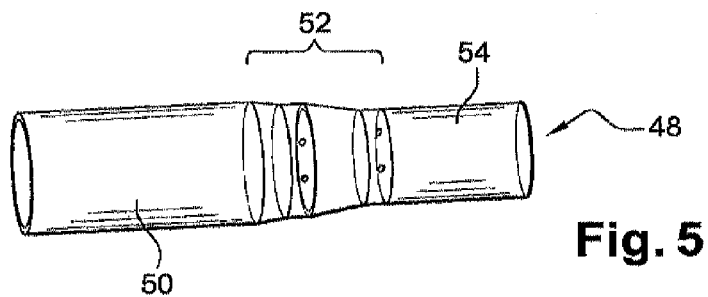
FIG. 5 is a perspective view of an outlet of the jettisoning circuit of an airplane.

FIG. 5 shows an outlet duct from a jettisoning circuit of an aircraft such as an airplane. Such an outlet duct is situated close to the trailing edge of a wing, for example. As shown here, the duct presents from left to right: an outlet zone 50, a fastening zone 52, and a bearing zone 54, which zones follow one another in this order. The fastening zone includes rivets that extend inside the duct, projecting from its inside face. In this zone, there must therefore be no contact between the endpiece 43 and the duct 48. Specifically, the zones 50 and 54 are cylindrical in shape, while the zone 52 has a flared shape. The inside diameter of the zone 54 is less than that of the zone 50.

The tooling 2 is used as follows.

Initially, the pneumatic line 4 is not fastened to the device 6. The endpiece 43 is in its retracted configuration. Thus, the stopper 34 is in its position farthest away from the cylinder. The stopper 34 is in its extended position. The arms 26 are in the open position.

The endpiece 43 is inserted in the duct 48 so as to pass through the zones 50 and 52 until it reaches the zone 54. As shown in FIG. 7, the zone 50 then extends radially between the spacers 30 together with the cylinder and the arms 26.

Once the endpiece 43, and in particular the front edge of the gasket 31, is facing the portion 54 of the duct, the arms 26 are moved towards the axis 22 and they are prevented from moving when in the closed position. In the present example, the arms carry at their free ends respective half-collars 60 suitable for being fastened to each other by means of bolt fasteners, each comprising in particular a respective screw portion 63 and a knob 61 acting as a nut and having the screw passing therethrough.

In the present example, each half-collar 60 presents an inside face 65 presenting a back-draft coming to bear against a corresponding draft face of the zone 50. Co-operation between these two faces prevents the device from being withdrawn by sliding along the axis 22. The free end of the duct 48 is in axial abutment against the yoke 24. The device 6 is thus rigidly fastened to the duct 48.

Thereafter the handles 50 of the capstan 46 are operated to turn the capstan and thus to cause the stopper 34 to slide towards the cylinder. This movement causes the gasket 31 to slide over the ramp face 44, thereby deforming the gasket by increasing the diameter d of its distal end edge. The gasket ends up by bearing radially via said edge against the inside face of the zone 54 of the duct, thereby providing sealing between the stopper and the duct.

The pneumatic line 4 is then connected to the device 6 and it is possible to perform the necessary testing, in particular by using the pressure gauge 16, which makes it possible visually to inspect the pressure inside the jettisoning circuit.

Because the capstan forms adjustable control means for varying the diameter of the gasket 31, the endpiece can be fitted to ducts 48 of different diameters.

It should be observed that the fastening of the tooling 6 by means of arms takes place without the arms coming into contact with the two rings of the zone 52 carrying rivets.

As can be seen, the device can be fitted in releasable and removable manner to the outlet of the jettisoning circuit in order to shut it temporarily and observe the pressure therein during leak testing. It provides an easy connection with the jettisoning circuit, while avoiding any contact with the portions carrying the rivets. It allows for venting once testing has been performed.

Naturally, numerous modifications could be applied to the invention without going beyond the ambit thereof.

The gasket 31 could be of an annular shape that is not circular, such that the modifiable dimension need not necessarily be a diameter. The device of the invention is usable with other types of jettisoning circuit, in particular those without rivets.

The invention claimed is:

1. A device for shutting an aircraft jettisoning circuit, wherein the device comprises a coupling endpiece and a cylinder, the endpiece carrying a sealing gasket and modification means suitable for modifying a dimension of a segment of the gasket, without modifying a dimension of some other segment of the gasket, and wherein the gasket is fastened, at a proximal axial end of the gasket, to the cylinder.

2. A device according to claim 1, wherein the modification means occupy a main duct of the gasket.

3. A device according to claim 1, wherein the modification means are mounted to move relative to the gasket.

4. A device according to claim 1, wherein the modification means present a face forming a ramp for the gasket.

5. A device for shutting an aircraft jettisoning circuit. wherein the device comprises a coupling endpiece, the endpiece carrying a sealing gasket and modification means suitable for modifying a dimension of a segment of the gasket, without modifying a dimension of some other segment of the gasket, wherein the modification means present a face forming a ramp for the gasket, and wherein the face presents a curved profile with a center of curvature situated outside the gasket.

6. A device according to claim 1, wherein the modification means are adjustable.

7. A device according to claim 1, including a member, for controlling the modification means.

8. A device for shutting an aircraft jettisoning circuit, wherein the device comprises a coupling endpiece, the endpiece carrying a sealing gasket and modification means suitable for modifying a dimension of a segment of the gasket, without modifying a dimension of some other segment of the gasket, the device capable of putting a duct and the endpiece into gas-flow communication through the gasket, the device including a flexible pneumatic hose and a rotary coupling, the hose and the coupling being capable of establishing said communication.

9. A device according to claim 1, comprising a cylinder and means independent of the endpiece for fastening the cylinder to the circuit.

10. A method of shutting an aircraft jettisoning circuit, wherein the circuit is shut by means of a device comprising a coupling endpiece carrying a sealing gasket, a cylinder., and means for modifying a dimension of the gasket, wherein the gasket is fastened, at a proximal axial end of the gasket, to the cylinder.

11. A device according to claim 1, wherein the segment of the gasket is an edge and wherein the other segment of the gasket is a second edge.

12. A device according to claim 7, wherein the member is a capstan.

13. A method of shutting an aircraft jettisoning circuit, wherein the circuit is shut by means of a device comprising a coupling endpiece carrying a sealing gasket and means for modifying a dimension of the gasket, wherein the means for modifying a dimension of the gasket present a face forming a ramp for the gasket, and wherein the face presents a curved profile with a center of curvature situated outside the gasket.

14. A method of shutting an aircraft jettisoning circuit, wherein the circuit is shut by means of a device comprising a coupling endpiece carrying a sealing gasket and means for modifying a dimension of the gasket, wherein the gasket is fastened, the device capable of putting a duct and the endpiece into gas-flow communication through the gasket, the device including a flexible pneumatic hose and a rotary coupling, the hose and the coupling being capable of establishing said communication.

* * * * *